US012665839B2

(12) United States Patent　(10) Patent No.:　US 12,665,839 B2
Patronas et al.　(45) Date of Patent:　Jun. 23, 2026

(54) SYSTEMS AND METHODS FOR RESILIENT SWITCH DEVICES

(71) Applicant: Mellanox Technologies, Ltd., Yokneam (IL)

(72) Inventors: Ioannis (Giannis) Patronas, Piraeus (GR); Paraskevas Bakopoulos, Ilion (GR); Nikolaos Argyris, Zografou (GR); Dimitrios Kalavrouziotis, Papagos (GR); Dimitrios Syrivelis, Volos (GR); Elad Mentovich, Tel Aviv (IL); Prethvi Ramesh Kashinkunti, Chicago, IL (US); Louis Bennie Capps, Jr., Georgetown, TX (US); Julie Irene Marcelle Bernauer, Palo Alto, CA (US); Eitan Zahavi, Zichron Yaakov (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 611 days.

(21) Appl. No.: 18/083,981

(22) Filed: Dec. 19, 2022

(65) Prior Publication Data

US 2024/0187440 A1　Jun. 6, 2024

(30) Foreign Application Priority Data

Dec. 1, 2022　(GR) ............................... 20220100995

(51) Int. Cl.
*H04L 45/28*　(2022.01)
*H04J 14/02*　(2006.01)
*H04Q 11/00*　(2006.01)
(52) U.S. Cl.
CPC .......... *H04L 45/28* (2013.01); *H04J 14/0287* (2013.01); *H04Q 2011/0043* (2013.01)

(58) Field of Classification Search
CPC ................. H04L 45/28; H04J 14/0287; H04Q 2011/0043
See application file for complete search history.

(56) References Cited

U.S. PATENT DOCUMENTS

| | | | | | |
|---|---|---|---|---|---|
| 6,567,576 | B2 * | 5/2003 | MacDonald | ....... | H04Q 11/0005 385/27 |
| 6,836,353 | B1 * | 12/2004 | Ramadas | ............ | H04J 14/0241 385/24 |

(Continued)

FOREIGN PATENT DOCUMENTS

| | | |
|---|---|---|
| EP | 1009192 A2 | 6/2000 |
| WO | 2017077093 A2 | 5/2017 |

OTHER PUBLICATIONS

Yojiro Mori and Ken-Ichi Sato. "High-port-count optical circuit switches for intra-datacenter networks", Journal of Optical Communications and Networking, vol. 13, No. 8, Aug. 2021, 10 pages. (Year: 2021).*

(Continued)

*Primary Examiner* — G. C. Neurauter, Jr.
(74) *Attorney, Agent, or Firm* — ALSTON & BIRD LLP

(57)　ABSTRACT

Systems and methods for providing resilience in network communications are provided that leverage novel switch device architectures. An example switch device for providing resilience in network communications includes a signal routing mechanism configured to selectively provide communication between at least one first network port and two of a plurality of second network ports. The signal routing mechanism receives an indication of a malfunction associated with one of the two of the plurality of second network ports and communicably connects the at least one first network port with the other of the two of the plurality of second network port. The first network ports may be posi- (Continued)

tioned in a first array and each of the plurality of second network ports may be positioned in a second array.

16 Claims, 8 Drawing Sheets

(56) References Cited

U.S. PATENT DOCUMENTS

| | | | |
|---|---|---|---|
| 6,981,174 B1 | 12/2005 | Hanning | |
| 7,099,578 B1 * | 8/2006 | Gerstel | H04Q 11/0062 |
| | | | 398/4 |
| 7,359,635 B2 * | 4/2008 | Helbing | H04J 14/0241 |
| | | | 398/57 |
| 9,491,526 B1 * | 11/2016 | Zhao | H04Q 11/0062 |
| 9,692,511 B1 * | 6/2017 | Webman | H04B 10/0795 |
| 10,229,017 B1 | 3/2019 | Zou et al. | |
| 10,694,268 B2 * | 6/2020 | Menard | H04Q 11/0005 |
| 10,834,484 B2 * | 11/2020 | Frankel | H04Q 11/0003 |
| 11,245,970 B1 * | 2/2022 | Jia | H04Q 11/0005 |
| 11,374,673 B2 * | 6/2022 | Hu | G02B 27/1006 |
| 11,451,889 B2 * | 9/2022 | Willcock | G06F 9/5027 |
| 2004/0078419 A1 | 4/2004 | Ferrari et al. | |
| 2004/0085893 A1 | 5/2004 | Wang et al. | |
| 2004/0133634 A1 | 7/2004 | Luke et al. | |
| 2005/0232629 A1 | 10/2005 | Amemiya et al. | |
| 2008/0130489 A1 | 6/2008 | Chao et al. | |
| 2008/0130491 A1 | 6/2008 | Chao et al. | |
| 2008/0285437 A1 | 11/2008 | Polland | |
| 2009/0257751 A1 | 10/2009 | Sadananda et al. | |
| 2013/0243416 A1 * | 9/2013 | Dahlfort | H04J 14/0212 |
| | | | 398/5 |
| 2014/0071812 A1 | 3/2014 | Pao et al. | |
| 2015/0098700 A1 * | 4/2015 | Zhu | H04Q 11/0005 |
| | | | 398/48 |
| 2015/0304238 A1 | 10/2015 | Brown | |
| 2016/0007102 A1 * | 1/2016 | Raza | H04L 49/356 |
| | | | 398/45 |
| 2016/0110270 A1 | 4/2016 | Iwashita | |
| 2019/0034305 A1 | 1/2019 | Perumal et al. | |
| 2019/0052567 A1 | 2/2019 | Muntz | |
| 2019/0114877 A1 | 4/2019 | Hohman | |
| 2021/0194724 A1 | 6/2021 | Lee | |
| 2021/0377160 A1 | 12/2021 | K | |
| 2022/0173980 A1 | 6/2022 | Yoon | |
| 2022/0209988 A1 | 6/2022 | Hatano et al. | |
| 2024/0098000 A1 * | 3/2024 | Patronas | H04L 43/065 |
| 2024/0098039 A1 * | 3/2024 | Patronas | H04L 49/557 |
| 2024/0098040 A1 * | 3/2024 | Patronas | H04L 49/30 |
| 2024/0098104 A1 * | 3/2024 | Patronas | H04L 47/17 |
| 2024/0113943 A1 * | 4/2024 | Patronas | H04L 41/12 |

OTHER PUBLICATIONS

"Credo Announces HiWire SWITCH AEC-Enabling Simpler Faster and More Reliable Dual TOR Connectivity", [online] Jul. 15, 2021. Retrieved from the internet <https://financialpost.com/pmn/press-releases-pmn/business-wire-news-releases-pmn/credo-announces-hiwire-switch-aec-enabling-simpler-faster-and-more-reliable-dual-tor-connectivity>.

Mellette, W. et al., "P-FatTree: A Multi-channel Datacenter Network Topology", [online] HotNets '16: Proceedings of the 15th ACM Workshop on Hot Topics in Networks, Nov. 2016, pp. 78-84. Retrieved from the internet <https://doi.org/10.1145/3005745.3005746>.

Michelogiannakis, G. et al., "Bandwidth Steering in HPC Using Silicon Nanophotonics", [online] In Proceedings of the International Conference for High Performance Computing, Networking, Storage and Analysis, Nov. 17-22, 2019, Denver, CO., pp. 1-25. Retrieved from the internet <https://doi.org/10.1145/3295500.3356145>.

Minkenberg, C. et al., "Large-Scale System Partitioning using OCS," [online] 2015 International Conference on Photonics in Switching (PS), Florence, Italy, 2015, pp. 235-237. Retrieved from the internet <doi: 10.1109/PS.2015.7329011>.

Patronas, et al., pending U.S. Appl. No. 17/956,035, filed Sep. 29, 2022.

Patronas, et al., pending U.S. Appl. No. 17/956,208, filed Sep. 29, 2022.

Patronas, et al., pending U.S. Appl. No. 17/964,367, filed Oct. 12, 2022.

Patronas, et al., pending U.S. Appl. No. 17/982,827, filed Nov. 8, 2022.

Patronas, et al., pending U.S. Appl. No. 17/982,895, filed Nov. 8, 2022.

* cited by examiner

200

200

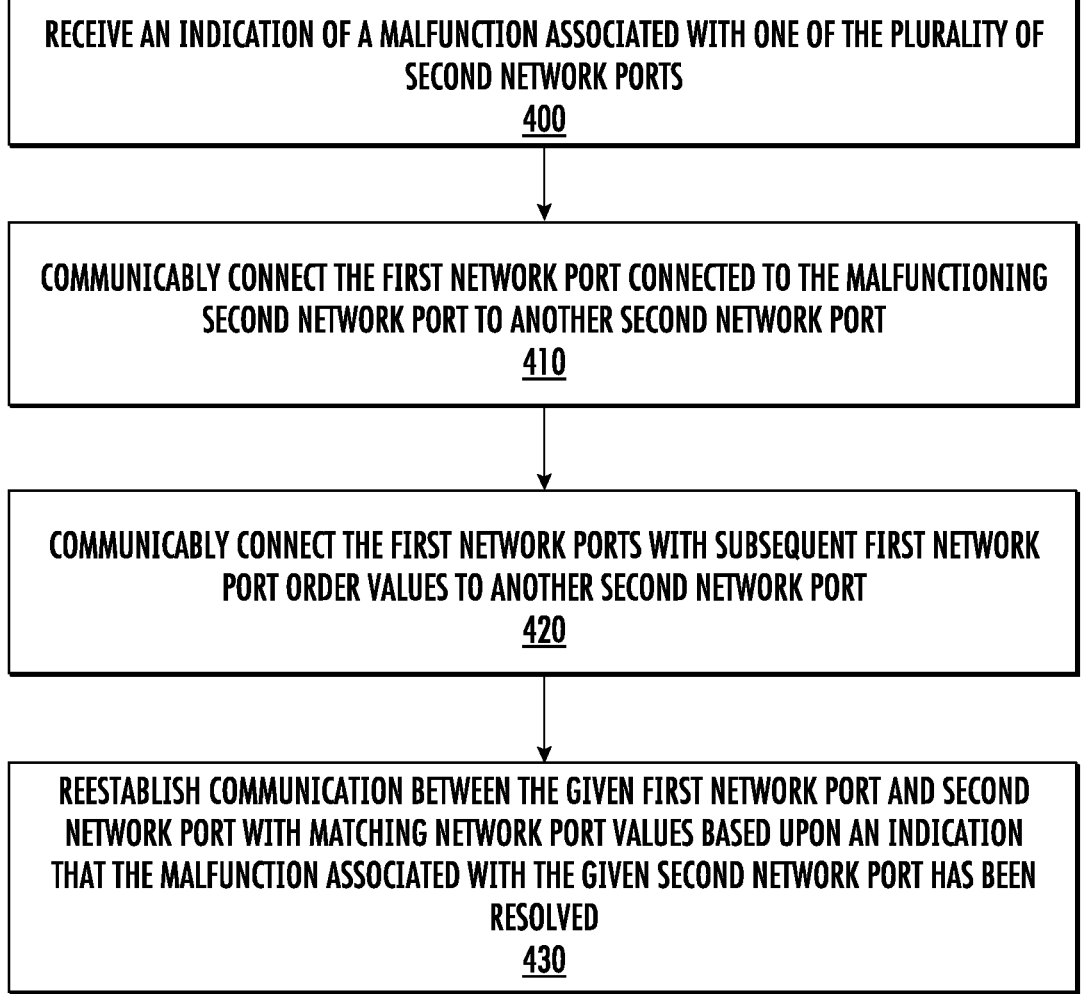

RECEIVE AN INDICATION OF A MALFUNCTION ASSOCIATED WITH ONE OF THE PLURALITY OF SECOND NETWORK PORTS
400

COMMUNICABLY CONNECT THE FIRST NETWORK PORT CONNECTED TO THE MALFUNCTIONING SECOND NETWORK PORT TO ANOTHER SECOND NETWORK PORT
410

COMMUNICABLY CONNECT THE FIRST NETWORK PORTS WITH SUBSEQUENT FIRST NETWORK PORT ORDER VALUES TO ANOTHER SECOND NETWORK PORT
420

REESTABLISH COMMUNICATION BETWEEN THE GIVEN FIRST NETWORK PORT AND SECOND NETWORK PORT WITH MATCHING NETWORK PORT VALUES BASED UPON AN INDICATION THAT THE MALFUNCTION ASSOCIATED WITH THE GIVEN SECOND NETWORK PORT HAS BEEN RESOLVED
430

SYSTEMS AND METHODS FOR RESILIENT SWITCH DEVICES

CROSS-REFERENCE TO RELATED APPLICATIONS

This application claims priority to Greek Patent Application No. 20220100995, filed Dec. 1, 2022, the entire contents of which application are hereby incorporated herein by reference.

TECHNOLOGICAL FIELD

Example embodiments of the present disclosure relate generally to network communication and, more particularly, to switch devices for providing resilience in network communications.

BACKGROUND

Datacenters and other networking environments (e.g., datacom, telecom, and/or other similar data/communication transmission networks) may include connections between switch systems, servers, racks, network ports, and other devices in order to provide for signal transmission between one or more of these elements. Network ports may include any device (e.g., switches, hosts, servers, and/or the like) by which data may be transferred, and these network ports strive to maintain consistency operability to avoid network outages. Applicant has identified a number of deficiencies and problems associated with network systems and associated communications. Through applied effort, ingenuity, and innovation, many of these identified problems have been solved by developing switch device solutions that are included in embodiments of the present disclosure, many examples of which are described in detail herein.

BRIEF SUMMARY

Systems, methods, and devices are described herein for providing resilience in network communications that leverage novel switch designs, configurations, and techniques. An example switch device for providing resilience in network communications may include a signal routing mechanism configured to selectively provide communication between at least one first network port and two of a plurality of second network ports. The signal routing mechanism may be further configured to receive an indication of a malfunction associated with one of the two of the plurality of second network ports and communicably connect the at least one first network port with the other of the two of the plurality of second network ports.

In some embodiments, the plurality of second network ports may include one or more primary second network ports and a first redundant second network port. The first redundant second network port may be offline in an instance in which each of the one or more primary second network ports are operable.

In some embodiments, the at least one first network port connected to the switch device may include a plurality of first network ports. In such an embodiment, an amount of the plurality of second network ports may be greater than an amount of the plurality of first network ports.

In some embodiments, each of the first network ports may be positioned in a first array, and each of the plurality of second network ports may be positioned in a second array.

In some further embodiments, each of the at least one first network port of the first array may define a first network port order value, and each of the plurality of second network ports in the second array may define a second network port order value. In such an embodiment, each of the at least one first network port may be assigned a default second network port having a common second network port order value as the first network port order value of the at least one first network port. Furthermore, the default second network port may be one of the two of the plurality of second network ports with which the at least one first network port is connected.

In some further embodiments, the first array and the second array may be in communication with the signal routing mechanism via one or more optical communication mediums.

In some further embodiments, the signal routing mechanism may be further configured to selectively provide communication between each of the plurality of second network ports and one of the pluralities of first network ports at a given instance.

In some still further embodiments, the plurality of first network ports may include one or more primary first network ports and a first redundant first network port. In such an embodiment, the first redundant first network port may be offline in an instance in which each of the one or more primary first network ports are operable.

In any embodiment, the switch device may be an optical switch.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIG. 4 is a flowchart illustrating an example method for providing network resilience via resilient switch devices in accordance with various embodiments of the present disclosure;

DETAILED DESCRIPTION

Overview

Figure 1:
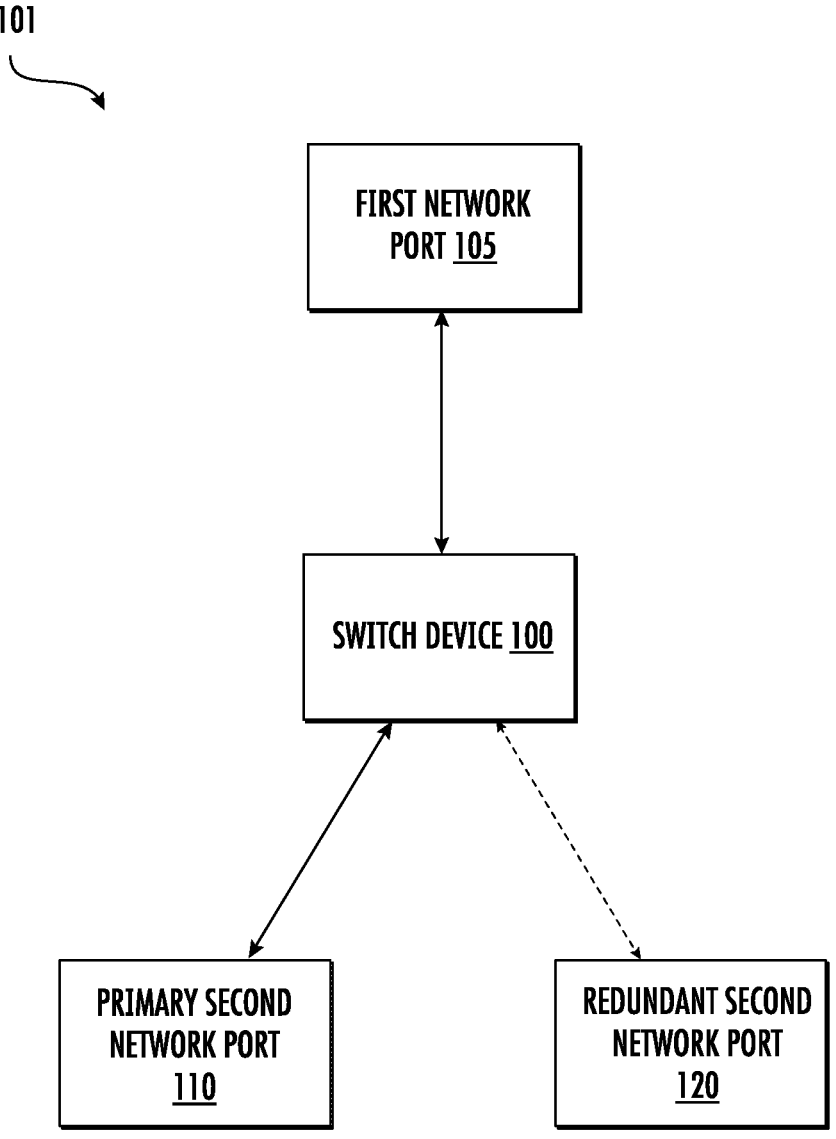
FIG. 1 illustrates an example system for implementing resilient switch devices in accordance with various embodiments of the present disclosure.

As described above, modern communication networks may include a large number of interconnected network devices referred to herein as network ports (e.g., switches, servers, hosts, etc.). These communication networks and systems often rely on network ports that are consistently operational to prevent, avoid, or substantially reduce the occurrences of network outages. Due to unintended malfunction, scheduled or unscheduled maintenance, varying environmental conditions, and/or the like, network ports will inevitably be inoperable. Conventional network resilience and failure recovery techniques leverage rigid algorithmic methods, such as modifying communication routing rules when a network port fails. These current resilience and failure recovery methods, however, are burdensome, inefficient, and reduce network performance. In other words, conventional systems and methods fail to provide network resilience solutions that address without negatively impacting network performance. Furthermore, these conventional systems fail to provide switch devices that are capable of implementing resilient or redundant network port implementations.

In order to solve these issues and others, embodiments of the present disclosure provide for new switch device architectures and topologies that provide network resilience via signal routing mechanisms that reroute communication between operational ports and redundant network ports in an instance a network port is non-operational. For example, a first network port may be connected to a corresponding second network port via a switch device, and the network port pair may transmit data therebetween. The example switch device may be communicably coupled to the first network port and the corresponding second network port and operate to direct and redirect network traffic. In an instance in which the switch device receives an indication that one of the network ports is inoperable (e.g., malfunctioning, undergoing maintenance, or otherwise offline), the switch device may establish communication between the operable network port of the network port pair and a redundant network port that is otherwise non-commissioned. The embodiments described herein may provide switch devices with switching elements configured to selectively access network ports of a system where the network ports intentionally remain offline or inoperable prior to required resilience operations (e.g., the redundant networks port's purpose may be limited to providing resilience operations). In other words, the resilience operations described herein may be accomplished via new switch device configurations that enable systems that include redundant or resilient network port configurations (e.g., the resiliency described herein is effectuated via novel optical switch techniques). In this way, the resilience embodiments of the present disclosure may eliminate or substantially reduce the impact of network port malfunction with minimal additional hardware.

The switch devices of the present disclosure are described herein with reference to various network ports that may, for example, be formed in arrays. Additionally, the switch devices described herein may, in some embodiments, be centralized, integrated, or otherwise comprise one or more of the network ports described hereinafter. For example, network port pairs may be described that are communicably coupled via the example switch device. In a centralized or integrated implementation, the switch device of the present disclosure may include switching elements that enable the switch device to direct communications to other networking devices, hosts, switches, ports, etc. may be connected, such as to one or more of the redundant network ports described herein. Said differently, the "switching elements" of the integral switch device may refer to the switching elements defined by the switch device. In some further integrated implementations, the switching elements of the switch may be physically located within a common housing, enclosure, or structure of the switch device.

Alternatively, in some embodiments, the switch devices may be distributed or otherwise formed of a plurality of components. For example, the switch device may be formed of a plurality of switch devices, signal routing mechanisms, sub-switch devices, etc. (within a common housing or formed separately) that collectively operate to reroute communications between network ports. As such, the network ports of these distributed switch devices may refer to switching elements supported by the plurality of switch devices, signal routing mechanisms, sub-switch devices, etc. that may be collectively connected to various components of an example network.

Furthermore, network ports may be described herein with reference to "input" and "output" as related to the communication direction for these devices. The terms "input" and "output," however, are used merely for illustrative purposes in that the data, signals, information, etc. that is transmitted by the network ports and subports described herein may travel in either direction. In other words, an example network port that operates as an input may also operate as an output, and an example network port that operates as an output may similarly operate as an input. The present disclosure, therefore, contemplates that the network ports described herein may operate to transmit data, signals, and information to and receive data, signals, and information from any device communicably coupled thereto regardless of reference to input, output, network layer, etc.

Furthermore, as would be evident to one of ordinary skill in the art in light of the present disclosure, the terms "substantially" and "approximately" indicate that the referenced element or associated description is accurate to within applicable engineering tolerances.

Embodiments of the present disclosure now will be described more fully hereinafter with reference to the accompanying drawings in which some but not all embodiments are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout.

Example Network Systems with Resilience

With reference to FIG. 1, an example system for implementing a resilient switch device in network communications 101 is illustrated. As shown, the system 101 may include a first network port 105, a primary second network port 110, and a redundant second network port 120. The first network port 105 and the primary second network port 110 may be communicably coupled in the system 101 such that data, signal, information, and/or the like may be transmitted therebetween in an instance in which the first network port 105 and the primary second network port 110 are operable. To facilitate this communication, the system 101 may include a switch device 100 that routes communication between the first network port 105 and the primary second network port 110 as described hereafter. Each of the network ports (e.g., the first network port 105 and the primary second network port 110) of the system 101 may include any networking component or device, such as a switch, a server, a network interface controller (NIC), a networking card, a host, and/or the like. Said differently, the present disclosure contemplates that any network port described herein (e.g., first network ports, second network ports, redundant first network ports, redundant second network ports, etc.) may refer to any networking device by, with, and/or through which data may be communicated.

The system 101 illustrated is in FIG. 1 as a simplified version of the system 101 in that only a first network port 105 and a second network port 110 are shown. As described herein, such as with reference to FIG. 2, the system 101 may include any number of first network ports and/or second network ports that may form network port pairs due to their connectivity to one another. In the simplified illustration of FIG. 1, the first network port 105 may be in communication with the primary second network port 110 in an instance in which each of these ports 105, 110 are operable. As described above, instances may occur in which the primary second network port 110 is non-operational (e.g., due to malfunction, maintenance, or otherwise offline or inoperable). Other than such an instance, the first network port 105 and the primary second network port 110 may be communicably coupled such that data may be transmitted therebetween.

In some embodiments, the system 101 may include a plurality of first network ports that may be configured to be communicably coupled with a plurality of second network ports as shown in FIG. 2. Said differently, any of the plurality of first network ports may be communicably coupled to any of the second network ports based upon the intended application of the system 101. In various embodiments, the first network ports and the second network ports may be the same type of network port (e.g., all of the network ports are switches). Alternatively, the first network ports may be different in structure or operation than the second network ports (e.g., the first network ports may be electrical switches and the second network ports may be servers).

With continued reference to FIG. 1, the system 101 may further include the switch device 100 that operates to route (and reroute) communication between the first network port 105 and the primary second network port 110. In some embodiments, the first network port 105 may be communicably coupled with the primary second network port 110 via the switch device 100 such that, when operable, communications between the first network port 105 and the primary second network port 110 are directed via the switch device 100. In other embodiments, the first network port 105 and the primary second network port 110 may be communicably coupled separate from the switch device 100, and the switch device 100 may operate only to redirect communications in the event of a malfunction as described hereinafter. In some embodiments, the switch device 100 may be an optical switch configured to route communication between network ports. Although the switch device 100 is illustrated as a singular switch device in FIG. 1, the present disclosure contemplates a distributed switch device with various switches collectively used to communicably couple the various network ports as defined above.

In order to provide resilience to the system 101 in the event that the primary second network port 110 is non-operational (e.g., device failure, maintenance, etc.), the system may include one or more redundant network ports (e.g., redundant second network port 120) connected to the switch device 100. In other words, the novel switch device architecture and topology illustrated in FIG. 1 may enable systems including multiple network ports by redirecting network communications in an instance in which one of the network ports connected by the switch device 100 is non-operational. In the simplified illustration of FIG. 1, a redundant second network port 120 may be provided. Although illustrated as a distinct redundant second network port 120, the present disclosure contemplates that a singular redundant network port (e.g., a first redundant network port) may operate to be selectively coupled with the first network port 105 and the primary second network port 110. In other words, in some embodiments, a redundant network port of the system 101 may be leveraged by first network ports and second network ports (e.g., a redundant network port that services multiple network layers). Although described herein with reference to a redundant second network port 120, various embodiments may also provide one or more redundant first network ports that are operably coupled with a second network port (e.g., primary second network port 110) in an instance in which a corresponding first network port (e.g., first network port 105) is non-operational.

The redundant second network port 120 may be inoperable, inactive, dormant, or otherwise not communicably coupled with an active/operable network port in an instance in which each of the other network ports (e.g., the first network port 105 and the primary second network port 110) are operational. In this way, for example, the redundant second network port 120 may provide a backup or alternative network port for any second network port in communication with the switch device 100. For example, if the primary second network port 110 malfunctions, the redundant second network port 120 may replace the malfunctioning primary second network port. In some embodiments, the number of redundant network ports may indicate the number of network ports that could be offline at a given time without network interruption.

As defined above, the network ports (e.g., first network port 105 and second network ports 110, 120) connected with the switch device 100 may be enabled by the switching elements defined by the switch device 100. In an instance in which one of the network ports (e.g., the primary second network port 110) is non-operational, the switch device 100 may reroute communications to a redundant network port (e.g., the redundant second network port 120) that is to provide resiliency for the non-operational network port. In this way, the switch device 100 of FIG. 1 may enable network resiliency via the switch level (e.g., by including novel architectures and topologies) not found in traditional switching devices.

Figure 2A:
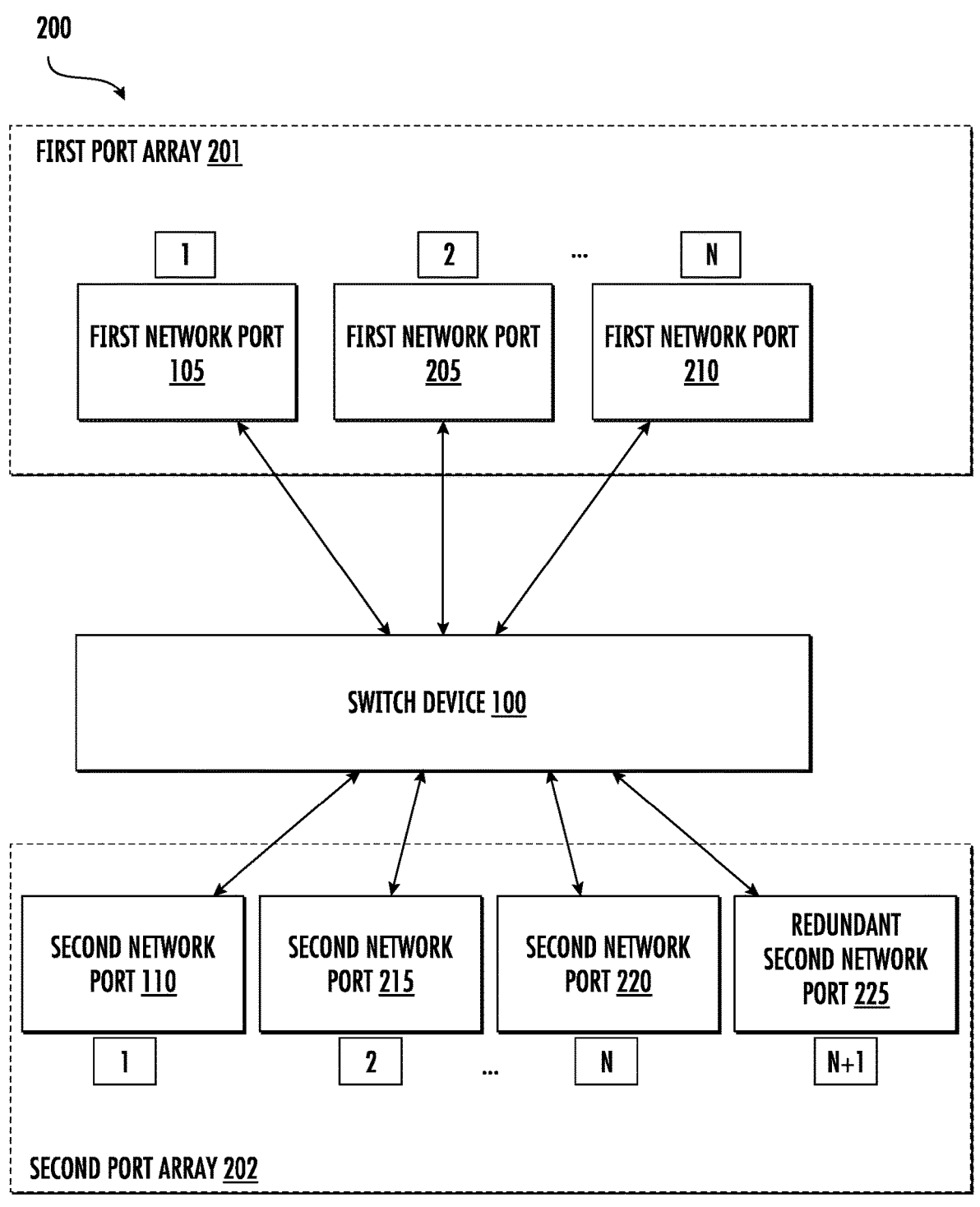
FIG. 2A illustrates an example system for implementing a resilient switch device that includes a centralized or integrated switch device in accordance with various embodiments of the present disclosure.
Figure 2B:
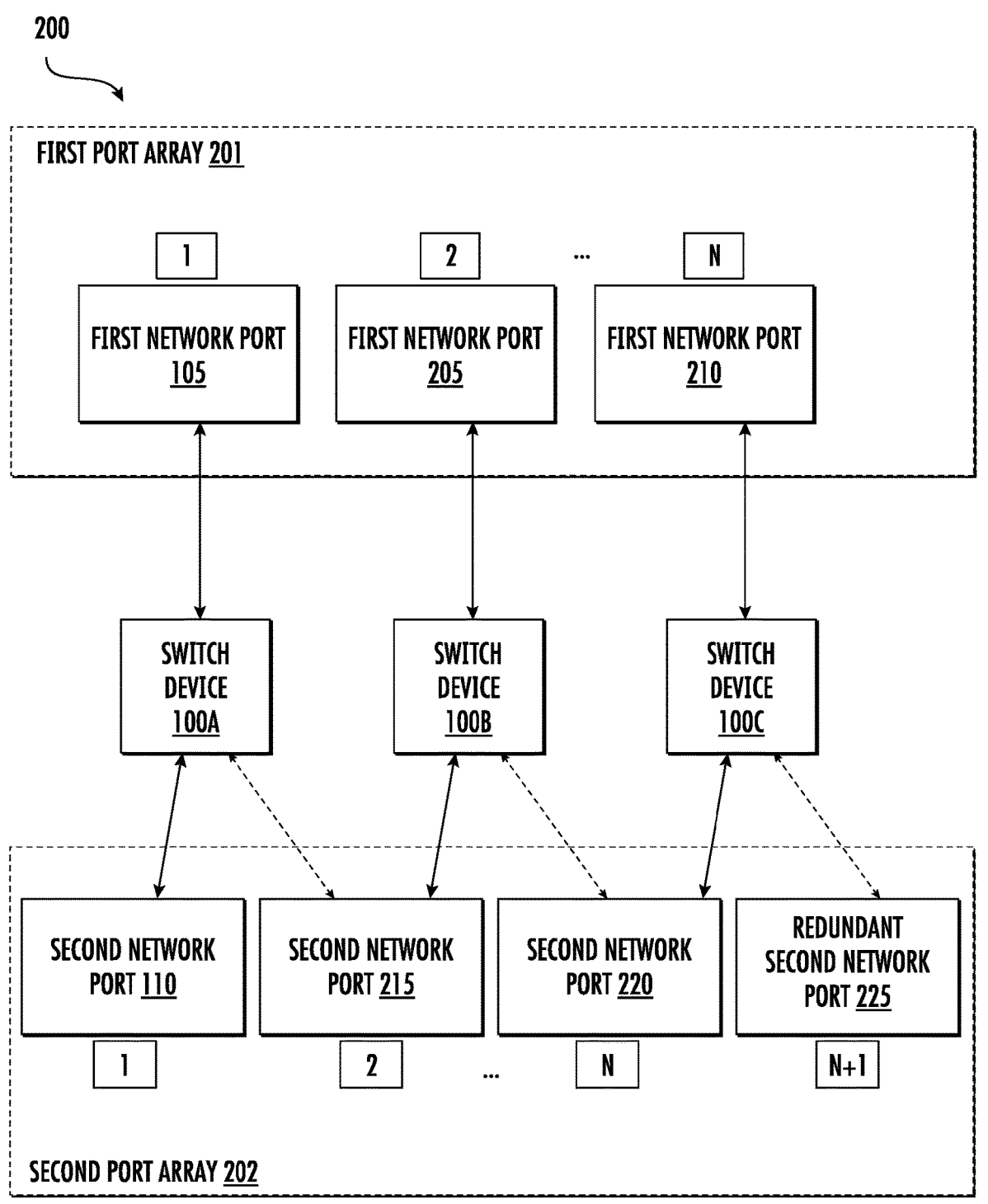
FIG. 2B illustrates an example system for implementing a resilient switch device that includes a distributed switch device in accordance with various embodiments of the present disclosure.

With reference to FIG. 2A, a system for network resilience 200 is illustrated that includes a plurality of first network ports and a plurality of second network ports with a centralized or integrated switch device 100. The plurality of first network for interfacing with the first network ports) may be arranged in a first port array 201, and the plurality of second network ports for interfacing with the second network ports) may be arranged in a second port array 202. Although the first port array 201 and the second port array 202 are described using relative location, the particular network ports need not physically be located in the way described herein. For example, the network port order value may not necessarily correspond to physical location in that the order refers to a way by which corresponding network ports. Although FIG. 2A illustrates a centralized or integrated switch device 100 as defined above, the switch device 100 may have various switch components as shown in FIG. 2B that may be distributed. Additionally, the first port array 201 and the second port array 202 may be in communication with the switch device, whether centralized or distributed, via one or more optical communication mediums (e.g., optical fiber) such that the switch device operates as an optical switch.

Each of the first network ports may be particular a first port order value that is unique to the particular first network port. In some embodiments, the first port order values may be sequential, such that each first network port is sequentially ordered in network communication. Although the first port order values shown in FIG. 2A are integer values, various other first port order values may be used to indicate the order of the first network ports. In the illustrated example embodiment, each of the first network ports is assigned a first port order value that corresponds to a positive integer value (1 through N). Although FIG. 2A illustrates three first network ports, any number of first network ports may be contemplated using the various methods discussed herein. By way of a non-limiting example, the first network port 115 may be assigned the first port order value of 1, the first network port 205 is assigned the first port order value of 2, and the first network port 210 is assigned the first port order value of N to indicate the last first port order value (e.g., the first network port 210 would be assigned the first port order value of 5 in an instance in which the first port array 201 included five first network ports).

Each of the second network ports may similarly be assigned a second port order value that is unique to the particular second network port. The second port order values may be sequential, such that each second network port is sequentially ordered in network communication. Although the second port order values shown in FIG. 2A are integer values, various other second port order values may be used to indicate the order of the second network ports. In the illustrated example embodiment, each of the second network ports is assigned a second port order value that corresponds to a positive integer value (1 through N). Although FIG. 2A illustrates four second network ports, any number of second network ports may be contemplated using the various methods discussed herein. By way of a nonlimiting example, the second network port 110 may be assigned the second port order value of 1, the second network port 215 may be assigned the second port order value of 2, the second network port 220 may be assigned the first port order value of N, and the redundant second network port 225 may be assigned the first port order value of N+1.

In an instance in which each of the first network ports and the second network ports are operational, each first network port may be communicably coupled to the second network port with a matching port order value (e.g., the first network port 115 with the first port order value of 1 is coupled to the second network port 110 with the second port order value of 1; the first network port 205 with the first port order value of 2 is coupled to the second network port 215 with the second port order value of 2; and the first network port 210 with the first port order value of N is coupled to second network port 220 with the first port order value of N. In such an instance, the redundant second network port 225 may be offline (e.g., not connected to any of the first network ports).

In an instance in which one of the second network ports is non-operational, the switch device 100 may be configured to reroute the corresponding first network port and all subsequent first network ports. As such, in an instance in which a second network port with a particular second port order value is non-operational, all first network ports with a first port order value the same or subsequent to (e.g., greater than) the second port order value of the non-operational second network port will be rerouted to the second port with the next sequential second port order value. For example, in an instance in which the second network port 215 with the second port order value of 2 is non-operational, the first network port 205 with the first port order value of 2 is rerouted to communicably couple with the second network port with the second port order value of 3. All subsequent first network ports are then rerouted to the second network port with a second port order value that is one greater than the first port order value of the particular first network port. For example, the first network port 210 with the first port order value of N would be rerouted to communicably couple with the redundant second network port 225 with the second port order value of N+1. Although described herein with reference to sequentially rerouting communications based upon port order, the present disclosure contemplates that any first network port may be rerouted to any other second network port based upon the intended application of the switch device 100.

In various embodiments, first network ports that have a first port order value that is prior to (e.g., less than) the second port order value of the non-operational second network port may be unaffected and are not rerouted. For example, in the example in which the second network port 215 with the second port order value of 2 is non-operational, the first network port 105 with the first port order value of 1 remains communicably coupled to the corresponding second network port 215 with the second port order value of 1.

With reference to FIG. 2B, a system for network resilience 200 may also include a distributed switch device (e.g., switch devices 100A, 100B, 100C, etc.). The switch device of FIG. 2B may provide similar functionality to the switch device 100 of FIG. 2A, but such functionality may be provided in a distributed implementation (e.g., a plurality of switch devices 100A, 100B, etc.) In such an instance, each of the first network ports may be connected to an individual switch device that may communicably couple the particular first network port to a plurality of second network ports. In other words, the switching elements of the switch device may be distributed amongst a plurality of switch device 100A, 100B, 100C, etc.). For example, the first network port 105 with a first network port order value of 1 may be connected to a switch device 100A that is configured to communicably connect the first network port 105 to the second network port 110 with a second network port order value of 1 or the second network port 215 with a second network port order value of 2. An additional switch device 100B may communicably connect the first network port 205 with a first port order value of 2 to the second network port 215 with a second network port order value of 2 or the second network port 220 with a second network port order value of 3. Additional switch devices may be provided such that each subsequent first network port may be communicably coupled to multiple second network ports in an instance in which a second network port is non-operational.

For example, the first network port 210 with a first port order value of N may be connected to switch device 100C that is configured to communicably connect the first network port 210 to the second network port 220 with a second network port order value of N or the redundant second network port 225 with a second network port order value of N+1.

As discussed above in reference to FIG. 2A, one or more of the first network ports and the second network ports may be rerouted based on a non-operational second network port. In an instance in which all of the network ports are operational, the first network port 105 with a first port order value of 1 may be communicably coupled to the second network port 110 with the second port order value of 1 via the switch device 100A; the first network port 205 with a first port order value of 2 may be communicably coupled to the second network port 215 with the second port order value of 2 via the switch device 100B; and the first network port 210 with a first port order value of N may be communicably coupled to the second network port 220 with the second port order value of B via the switch device 100C. In such an instance, the redundant second network port 225 may be offline.

In an instance in which one of the second network ports is non-operational, the individual switch devices 100A, 100B, 100C may be configured to reroute the connected first network port to the subsequent second network port. As such, in an instance in which a second network port with a particular second port order value is non-operational, all first network ports with a first port order value the same or subsequent to (e.g., greater than) the second port order value of the non-operational second network port will be rerouted to the second port with the next sequential second port order value via the individual switch devices. For example, in an instance in which the second network port 215 with the second port order value of 2 is non-operational, the first network port 205 with the first port order value of 2 is rerouted to communicably couple with the second network port with the second port order value of 3 via individual switch device 100B. All subsequent first network ports are then rerouted to the second network port with a second port order value that is one greater than the first port order value of the particular first network port. For example, the first network port 210 with the first port order value of N would be rerouted to communicably couple with the redundant second network port 225 with the second port order value of N+1 via the individual switch device 100C. As described above, although described herein with reference to sequentially rerouting communications based upon port order, the present disclosure contemplates that any first network port may be rerouted to any other second network port based upon the intended application of the switch device(s) 100A, 100B, 100C, etc.

Figure 6:
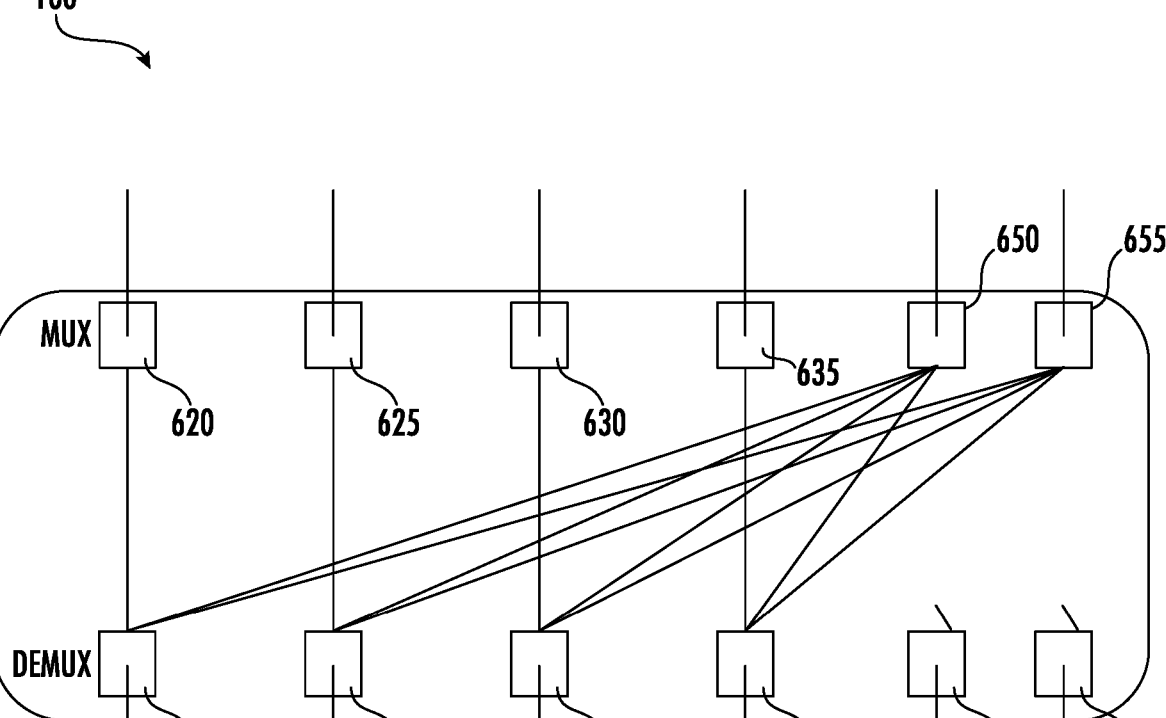
FIG. 6 illustrates another example switch device implementation for network resilience in accordance with various embodiments of the present disclosure.

The distributed switch device 100 as shown in FIG. 2B may include one or more centralized components (e.g., processor, memory, etc. as described with reference to FIG. 3). Additionally or alternatively, each of the individual switch devices 100A, 100B, 100C may have at least some of the components discussed in reference to FIG. 3 to perform operations individual (e.g., each switch device may have an independent processor). The present disclosure further contemplates that the system 200 may include any number of redundant network ports that are inactive, inoperable, dormant, and/or the like prior to malfunction of a network port. Additionally, redundant network ports may be provided in the first port array 201 in addition to the second port array 202, as shown in FIG. 6.

Example Switch Device

Figure 3:
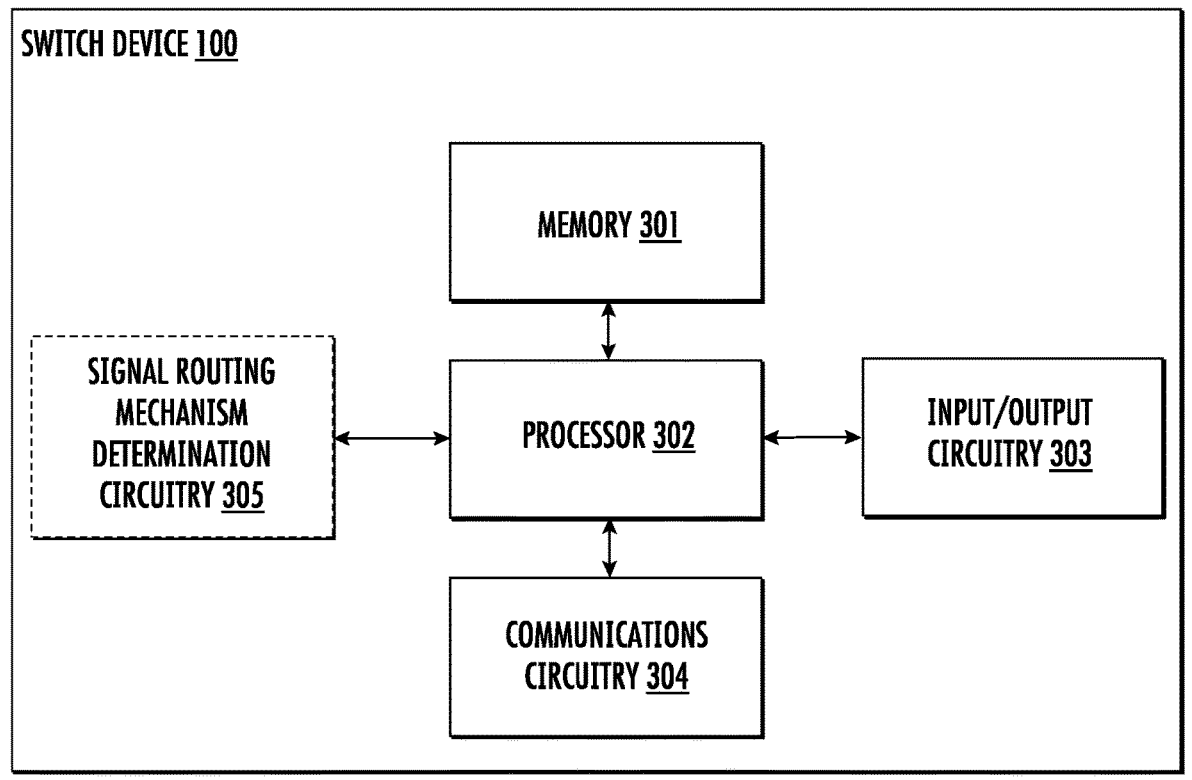
FIG. 3 is a block diagram of example circuitry components of an example switch device for use with various embodiments of the present disclosure.

FIG. 3 illustrates a schematic block diagram of example circuitry, some or all of which may be included in a switch device 100. The components discussed in FIG. 3 may be a part of the switch device 100 or a controller, networking card, computing device, and/or the like that is associated with the switch device 100. In accordance with some example embodiments, the switch device 100 may include a memory 301, processor 302, input/output circuitry 303, and/or communications circuitry 304. Moreover, in some embodiments, signal routing mechanism determination circuitry 305 may also or instead be included in the switch device 100. For example, where signal routing mechanism determination circuitry 305 is included in the switch device 100 (e.g., integrated or distributed), the signal routing mechanism determination circuitry 305 may be configured to facilitate the functionality discussed herein regarding establishing and/or terminating communication between various network ports and redundant network ports. An apparatus, such as the switch device 100, may be configured, using one or more of circuitry 301-305, to execute the operations described herein.

Although the term "circuitry" as used herein with respect to components 301-305 is described in some cases using functional language, it should be understood that the particular implementations necessarily include the use of particular hardware configured to perform the functions associated with the respective circuitry as described herein. It should also be understood that certain of these components 301-305 may include similar or common hardware. For example, two sets of circuitries may both leverage use of the same processor, network interface, storage medium, or the like to perform their associated functions, such that duplicate hardware is not required for each set of circuitries. It will be understood in this regard that some of the components described in connection with the switch device 100 may be housed within this device, while other components are housed within other devices (e.g., a controller in communication with the switch device 100).

Although the term "circuitry" should be understood broadly to include hardware, in some embodiments, the term "circuitry" also includes software for configuring the hardware. For example, in some embodiments, "circuitry" may include processing circuitry, storage media, network interfaces, input/output devices, and the like. In some embodiments, other elements of the switch device 100 may provide or supplement the functionality of particular circuitry. For example, the processor 302 may provide processing functionality, the memory 301 may provide storage functionality, the communications circuitry 304 may provide network interface functionality, and the like.

In some embodiments, the processor 302 (and/or co-processor or any other processing circuitry assisting or otherwise associated with the processor) may be in communication with the memory 301 via a bus for passing information among components of, for example, switch device 100. The memory 301 may be non-transitory and may include, for example, one or more volatile and/or non-volatile memories, or some combination thereof. In other words, for example, the memory 301 may be an electronic storage device (e.g., a non-transitory computer readable storage medium). The memory 301 may be configured to store information, data, content, applications, instructions, or the like, for enabling an apparatus, e.g., the switch device 100, to carry out various functions in accordance with example embodiments of the present disclosure.

Although illustrated in FIG. 3 as a single memory, the memory 301 may comprise a plurality of memory components. The plurality of memory components may be embodied on a single computing device or distributed across a plurality of computing devices. In various embodiments, the memory 301 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 301 may be configured to store information, data, applications, instructions, or the like for enabling the switch device 100 to carry out various functions in accordance with example embodiments discussed herein. For example, in at least some embodiments, the memory 301 is configured to buffer data for processing by the processor 302. Additionally or alternatively, in at least some embodiments, the memory 301 is configured to store program instructions for execution by the processor 302. The memory 301 may store information in the form of static and/or dynamic information. This stored information may be stored and/or used by the switch device 100 during the course of performing its functionalities.

The processor 302 may be embodied in a number of different ways and may, for example, include one or more processing devices configured to perform independently. Additionally, or alternatively, the processor 302 may include one or more processors configured in tandem via a bus to enable independent execution of instructions, pipelining, and/or multithreading. The processor 302 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 3 as a single processor, in some embodiments, the processor 302 comprises a plurality of processors. The plurality of processors may be embodied on a single computing device or may be distributed across a plurality of such devices collectively configured to function as the switch device 100. The plurality of processors may be in operative communication with each other and may be collectively configured to perform one or more functionalities of the switch device 100 as described herein.

In an example embodiment, the processor 302 is configured to execute instructions stored in the memory 301 or otherwise accessible to the processor 302. Alternatively, or additionally, the processor 302 may be configured to execute hard-coded functionality. As such, whether configured by hardware or software methods, or by a combination thereof, the processor 302 may represent an entity (e.g., physically embodied in circuitry) capable of performing operations according to an embodiment of the present disclosure while configured accordingly. Alternatively, as another example, when the processor 302 is embodied as an executor of software instructions, the instructions may specifically configure processor 302 to perform one or more algorithms and/or operations described herein when the instructions are executed. For example, these instructions, when executed by processor 302, may cause the switch device 100 to perform one or more of the functionalities of switch device 100 as described herein.

In some embodiments, the switch device 100 further includes input/output circuitry 303 that may, in turn, be in communication with the processor 302 to provide an audible, visual, mechanical, or other output and/or, in some embodiments, to receive an indication of an input from a user or another source. In that sense, the input/output circuitry 303 may include means for performing analog-to-digital and/or digital-to-analog data conversions. The input/output circuitry 303 may include support, for example, for a display, touchscreen, keyboard, mouse, image capturing device (e.g., a camera), microphone, and/or other input/output mechanisms. Input/output circuitry 303 may include a user interface and may include a web user interface, a mobile application, a kiosk, or the like. The input/output device may be used by a user to view and/or adjust malfunction indications (e.g., a user may indicate whether a malfunction has been resolved).

The processor 302 and/or user interface circuitry comprising the processor 302 may be configured to control one or more functions of a display or one or more user interface elements through computer-program instructions (e.g., software and/or firmware) stored on a memory accessible to the processor 302 (e.g., the memory 301, and/or the like). In some embodiments, aspects of input/output circuitry 303 may be reduced as compared to embodiments where the switch device 100 may be implemented as an end-user machine or other type of device designed for complex user interactions. In some embodiments (like other components discussed herein), the input/output circuitry 303 may be eliminated from switch device 100. The input/output circuitry 303 may be in communication with memory 301, communications circuitry 304, and/or any other component(s), such as via a bus. Although more than one input/output circuitry and/or other component can be included in the switch device 100, only one is shown in FIG. 3 to avoid overcomplicating the disclosure (e.g., as with the other components discussed herein).

The communications circuitry 304, in some embodiments, includes any means, such as a device or circuitry embodied in either hardware, software, firmware or a combination of hardware, software, and/or firmware, that is configured to receive and/or transmit data from/to a network and/or any other device, circuitry, or module in communication with the switch device. In this regard, the communications circuitry 304 may include, for example, a network interface for enabling communications with a wired or wireless communication network. For example, in some embodiments, communications circuitry 304 is configured to receive and/or transmit any data that may be stored by the memory 301 using any protocol that may be used for communications between computing devices. For example, the communications circuitry 304 may include one or more network interface cards, antennae, transmitters, receivers, buses, switches, routers, modems, and supporting hardware and/or software, and/or firmware/software, or any other device suitable for enabling communications via a network. Additionally or alternatively, in some embodiments, the communications circuitry 304 includes circuitry for interacting with the antenna(s) to cause transmission of signals via the antenna(e) or to handle receipt of signals received via the antenna(e). These signals may be transmitted by the switch device 100 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), World-wide Interoperability for Microwave Access (WiMAX) or other proximity-based communications protocols. The communications circuitry 304 may additionally or alternatively be in communication with the memory 301, the input/output circuitry 303, and/or any other component of switch device 100, such as via a bus. The communication circuitry 304 of the switch device 100 may also be configured to receive and transmit information with the various network ports discussed herein.

In some embodiments, the switch device 100 includes hardware, software, firmware, and/or a combination of such components, configured to support various aspects of signal routing in network ports as described herein. It should be appreciated that in some embodiments, the signal routing mechanism determination circuitry 305 performs one or more of such exemplary actions in combination with another set of circuitry of the switch device 100, such as one or more of the memory 301, processor 302, input/output circuitry 303, and communications circuitry 304.

For example, in some embodiments, the signal routing mechanism determination circuitry 305 utilizes processing circuitry, such as the processor 302 and/or the like, to perform one or more of its corresponding operations. In a further example, and in some embodiments, some or all of the functionality of the signal routing mechanism determination circuitry 305 may be performed by processor 302. In this regard, some or all of the example processes and algorithms discussed herein can be performed by at least one processor 302 and/or signal routing mechanism determination circuitry 305. It should also be appreciated that, in some embodiments, signal routing mechanism determination circuitry 305 may include a separate processor, specially configured field programmable gate array (FPGA), or application specific interface circuit (ASIC) to perform its corresponding functions.

Additionally or alternatively, in some embodiments, the signal routing mechanism determination circuitry 305 uses the memory 301 to store collected information. For example, in some implementations, the signal routing mechanism determination circuitry 305 includes hardware, software, firmware, and/or a combination thereof, that interacts with the memory 301 to send, retrieve, update, and/or store data.

Accordingly, non-transitory computer readable storage media can be configured to store firmware, one or more application programs, and/or other software, which include instructions and/or other computer-readable program code portions that can be executed to direct operation of the switch device 100 to implement various operations, including the examples shown herein. As such, a series of computer-readable program code portions may be embodied in one or more computer-program products and can be used, with a device, switch device 100, database, and/or other programmable apparatus, to produce the machine-implemented processes discussed herein. It is also noted that all or some of the information discussed herein can be based on data that is received, generated and/or maintained by one or more components of the switch device 100. In some embodiments, one or more external systems (such as a remote cloud computing and/or data storage system) may also be leveraged to provide at least some of the functionality discussed herein.

Example Methods for Providing Resilience in Network Communications

FIG. 4 illustrates an example method for providing resilience in network communications via switch devices. The method may be carried out by embodiments of the system described herein (e.g., the switch device 100 and/or related computing devices). An example system may include at least one non-transitory storage device and at least one processing device coupled to the at least one non-transitory storage device, as described above. In such an embodiment, the at least one processing device may be configured to carry out the method discussed herein. The operations discussed in reference to FIG. 4 may be carried out by any of the embodiments discussed in FIG. 1-2B. The method may be carried out using a centralized or integrated switch device (e.g., as shown in FIG. 2A) and/or a distributed switch device (e.g., as shown in FIG. 2B).

Referring now to Block 400 of FIG. 4, the method may include receiving an indication of a malfunction associated with one of the plurality of second network ports. The indication of the malfunction associated with one of the plurality of second network ports may be, for example, provided via a transmission (e.g., a message) from the malfunctioning network port. Additionally or alternatively, the malfunction may be actively detected by the switch device 100 (e.g., the indication of a malfunction may be a change in the volume, speed, and/or any characteristic of the data received (or lack thereof) by the switch device 100 from the malfunctioning network port).

The indication of malfunction may be received in an instance in which the particular network port is currently offline or is required to be offline. For example, the indication of malfunction may indicate that the particular second network port is malfunctioning, requires maintenance, and/or any other reason(s) that the network port is going to (or currently is) offline, inoperable, inactive, etc. In some instances, the indication of malfunction may be received before the associated network port is offline to allow for the switch device 100 to use a redundant network port to prevent any outages in the network. For example, if a network port is in the process of failing or requires imminent maintenance, the switch device 100 may receive the indication of malfunction while the network port is online to allow for an efficient transfer. Additionally or alternatively, the indication of malfunction may be received after the associated network port is offline, inactive, or inoperable, and, therefore, such that operations by the switch device may be responsive as opposed to proactive.

As discussed herein, each first network port may be communicably connected to a corresponding second network port in an instance in which each of the network ports are operable. In various embodiments, each of the first network ports are assigned a first port order value and the each of the second network ports are assigned a second port order value. In an instance in which each of the network ports are operable, each first network port with a first port order value is communicably connected to the second network port with the matching second port order value (e.g., a first network port with a first port order value of 1 is communicably connected to the second network port with a second port order value of 1). In an instance in which each network port is operable, the redundant network ports (e.g., the redundant second network port 225) may remain offline, dormant, or otherwise inoperable.

Referring now to Block 410 of FIG. 4, the method may include communicably connecting the first network port connected to the malfunctioning second network port to another second network port. As discussed above, in an instance in which a second network port with a particular second network port order malfunctions, the communicably connected first network port (e.g., the first network port with the matching first network port order) may be rerouted from the malfunctioning second network port to the subsequent second network port (e.g., the second network port with the second network port order that is subsequent to the second network port order of the malfunctioning second network port). The connections may be rerouted via the switch device (e.g., either a centralized or integrated switch device 100 as shown in FIG. 2A or a distributed switch device as shown in FIG. 2B).

Referring now to Block 420 of FIG. 4, the method may include communicably connecting the first network ports with subsequent first network port order values to another second network port. In various embodiments, each of the first network ports with a first network port order that is subsequent to the affected first network port (e.g., the first network port that was originally connected to the malfunctioning second network port) may also be rerouted to subsequent second network ports. For example, in an instance in which the malfunctioning second network port has a second network port order of 2, each of the first network ports that have a first network port order greater than 2 may be rerouted. In such an instance, each of the first network ports that have a first network port order greater than 2 are rerouted to be communicably connect with the second network port that has a second network port value that is one greater than the first network port value of the particular first network port. For example, as discussed above in reference to FIGS. 2A and 2B, the first network port 210 with a first network port value of N is rerouted to be communicably connected to the second network port that has a second network port value of N+1 (e.g., the redundant second network port 225).

Referring now to optional Block 430 of FIG. 4, the method may include reestablishing communication between the particular first network port and second network port with matching network port values based upon an indication that the malfunction associated with the particular second network port has been resolved. The malfunction may be resolved in various ways, such as determining the indication of malfunction was unnecessary, repairing any malfunctions, replacing the network port, preforming any maintenance on the network port, and/or the like.

In various embodiments, the system may receive an indication that the malfunction has been resolved. The indication may be automated or received from a user. The indication that the malfunction is resolved may be automated provided by a system operator or user, etc. For example, the connection between the network ports associated with the malfunction indication and the switch device may be restored, such that the switch device determines that the particular network port is now operational. In various embodiments, the system may include a user interface that allows the user to indicate that the malfunction has been resolved. In some instances, the system may receive the indication from a user that the malfunction is resolved, and the system may perform one or more automated communications with the particular network port to confirm that the network port is operational. Additionally, any communication with the other network ports may also be terminated and the redundant second network port may return to an inoperable, dormant, or offline state, so as to avoid unnecessary hardware and/or energy usage.

Additional Switch Device Configurations

Figure 5:
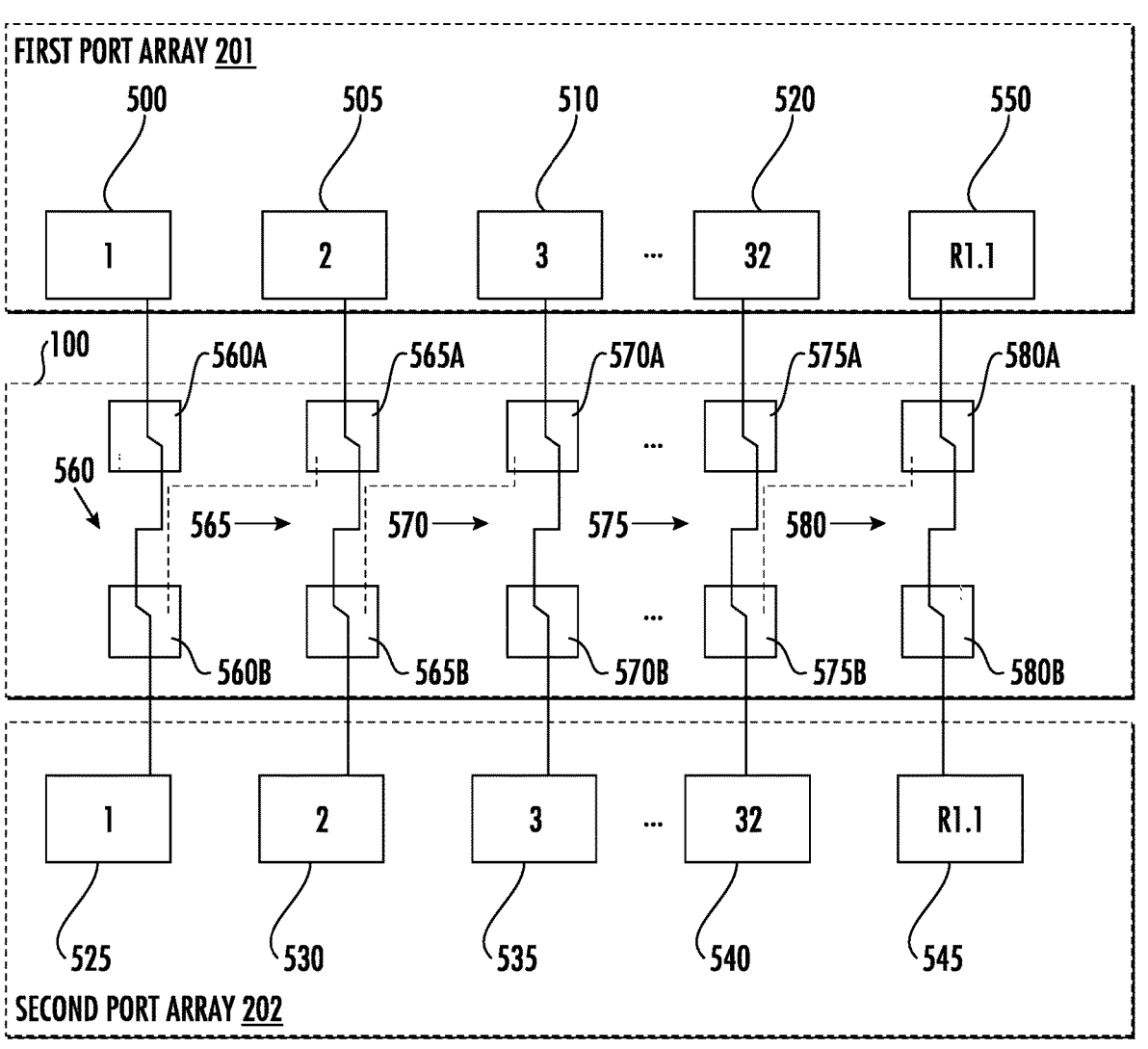
FIG. 5 illustrates an example switch device implementation for network resilience in accordance with various embodiments of the present disclosure.

FIGS. 5 and 6 illustrate additional embodiments in which the novel switch device architectures and topologies described herein may be used. With reference to FIG. 5, an example system for network resilience using various signal routing mechanisms of a switch device 100 is illustrated. As shown, the switch device 100 may have various switch device components (e.g., signal routing mechanisms) that act as individual switches (e.g., switching elements) for connecting between various endpoint connections of the switch device 100. Additionally, FIG. 5 illustrates an example system with a redundant first network port 550 and a redundant second network port 545. The system shown has a first port array 201 with thirty-two (32) first network ports (e.g., first network ports 500, 505, 510, 520) with an additional redundant first network port 550. The system also has a second port array 202 with thirty-two (32) second network ports (e.g., second network ports 525, 530, 535, 540) and an additional redundant second network port 545.

The first port array 201 and the second port array 202 may be communicably connected via the switch device 100. As shown, each individual signal routing mechanism (e.g., switching element devices 560, 565, 570, 575, 580) may be configured to reroute communication between network ports. As shown, the first network port 500 with the first network port order value of 1 may be communicably connected to either the second network port 525 with the second port order value of 1 or the second network port 530 with the second port order value of 2 via the signal routing mechanism 560 (e.g., the switch device can reroute communication via a multiplexer 560A). Additionally, the second network port 525 with the second port order value of 1 may be communicably connected to either the first network port 500 with the first port order value of 1 or the first network port 505 with the first port order value of 2 via the signal routing mechanism 560.

Each of the signal routing mechanisms (e.g., switching element devices 560, 565, 570, 575, 580) may include multiplexing/demultiplexing components in order to selectively reroute communication between network ports. By way of example, signal routing mechanism 560 includes multiplexers 560A, 560B; signal routing mechanism 565 includes multiplexers 565A, 565B; signal routing mechanism 570 includes multiplexers 570A, 570B; signal routing mechanism 575 includes multiplexers 575A, 575B; and signal routing mechanism 580 includes multiplexers 580A, 580B). By way of a further, non-limiting example, the signal routing mechanisms 560, 565, 570, 575, 580 may include a 1×2 demultiplexer, and each demultiplexer may be connected to two different 2×1 multiplexers. One multiplexer may be connected to the initial connection (e.g., providing connectivity between first port 500 and second port 525), and a second multiplexer may be connected to the next signal routing mechanism (e.g., signal routing mechanism 565). In this way, the switch 100 may leverage a next neighbor rerouting of communications in the event that, for example, the first port 500 is inoperable. In such a resiliency example (e.g., when the first port 500 is inoperable), the switch device 100 may, via the multiplexer(s) and demultiplexer(s), sequentially reroute communication to the neighbor port sequentially ordered in network communication. For example, the signal routing mechanisms may communicably couple the second network port 525 with the first network port 505, communicably couple the second network port 530 with the first network port 510, etc. such that the ending/final second network port 340 is communicably coupled with the redundant first network port 550. Although described herein with reference to a sequential rerouting of communications, the present application contemplates that any order of connectivity may be leveraged based upon the intended application of the switch device 100. Furthermore, although described herein with reference to two (2) 2×1 multiplexers, the present application contemplates that any type of multiplexer (e.g., 3×1, 4×1, etc.) may be used based upon the intended application of the switch device 100.

FIG. 6 illustrates a switch device 100 for enabling network resilience in which each of the network ports may be connected via the switch device 100. The switch device 100 may operate similar to the switch device of FIG. 5, but the implementation of FIG. 6 may not require the next neighbor rerouting of communications shown in FIG. 5. For example, the switching elements of the switch 100 in FIG. 6 may directly route communications to switching elements (e.g., elements 650 and/or 655) directly coupled with the redundant network ports in the event of a malfunction associated with a network port connected to the switch device (e.g., as opposed to a sequential neighbor network port). As shown, each of the second switching elements (e.g., second switching elements 600, 605, 610, 615) may be connectable to one or more switching elements 650, 655 that are communicably coupled with redundant network ports (e.g., redundant network port 550 in FIG. 5) in an instance the network port communicably coupled with the corresponding first switching element is malfunctioning or otherwise inoperable. In an instance in which each of the first network ports are operable (e.g., the network ports (not shown) connected to the switch device 100 via first switching elements 6220, 625, 630, 635), the second switching elements 600, 605, 610 615 are communicably connected to the corresponding first switching element (e.g., first switching element 620 is communicably connected to second switching element 600; first switching element 625 is communicably connected to second switching element 605; first switching element 630 is communicably connected to second switching element 610; and first switching element 635 is communicably connected to second switching element 615. In an instance in which one of the first network ports (not shown), connected to the switch device 100 via the first switching elements, malfunctions the corresponding second switching element routes communications directly via the first switching elements 650, 655 to a redundant first network port connected thereto (e.g., first redundant network port 550 in FIG. 5) In this way, the switch devices of FIG. 6 provide redundancy/resilience without impact to other network ports (e.g., connected to the switch device 100 via the switching elements described herein).

Additionally, each of the first switching elements (e.g., 620, 625, 630, 635) may be connectable to one or more second switching elements 660, 665 in an instance in which the second network port (not shown) connected to the first network port via a corresponding second switching elements is malfunctioning. Example communication connections between second switching elements 600, 605, 610, and 615 are illustrated, but similar communication connections for the remaining ports and redundant ports are absent for clarity. The number of first network ports, redundant first network ports, second network ports, and redundant second network ports may vary based on application or design.

Figure 7A:
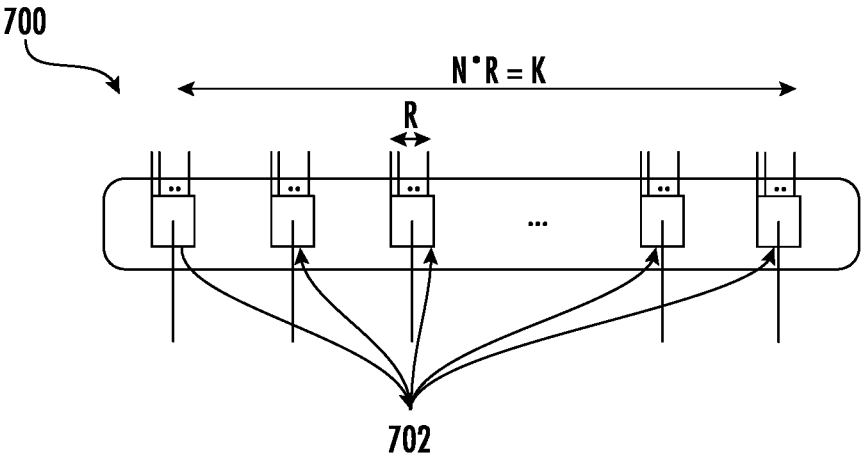
FIGS. 7A-7B illustrate example multiplexer and demultiplexer arrays for implementing one or more switch device embodiments of the present disclosure.
Figure 7B:
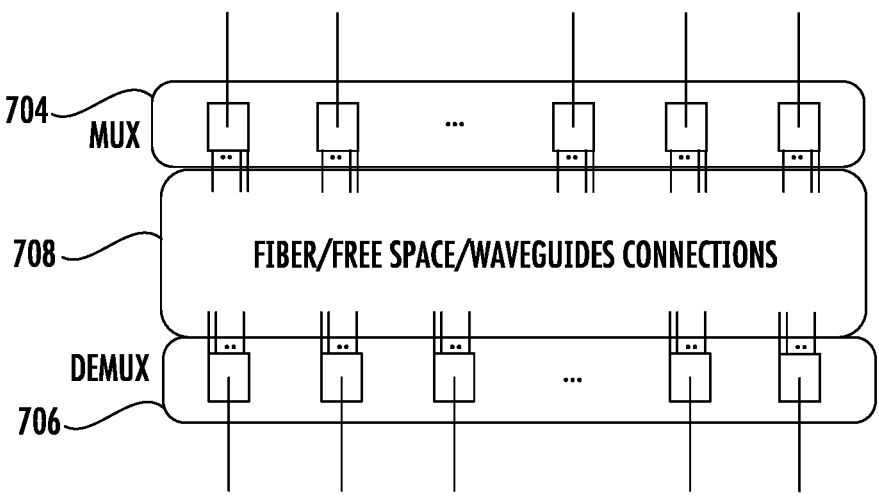

With reference to FIGS. 7A-7B, example multiplexer and demultiplexer arrays are illustrated. As shown in FIG. 7A, an example multiplexer/demultiplexer array 700 is illustrated. As shown, the array 700 may represent a single device, housing, enclosure, etc. that supports one or more multiplexers and/or demultiplexers 702. The present disclosure, however, contemplates that the array 700 may include any number of multiplexers and/or demultiplexers based upon the intended switch device application of the array 700.

Furthermore, although illustrated and described herein with reference to a single, integrated array 700, the present disclosure contemplates that any number of arrays having any number of distinct multiplexer(s) and/or demultiplexer(s) may be used without limitation. As shown in FIG. 7B, the arrays described with reference to FIG. 7A may be used to achieve the functionality associated with the novel switch devices of the present disclosure. As shown, a first array 704 of multiplexers is illustrated communicably coupled with a corresponding second array 706 of demultiplexers. The communication may be achieved via any communication medium 708, such as optical fibers, waveguides, free space connectivity, and/or the like based upon the intended application of the switch device formed by these arrays 704, 706.

Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A switch device for providing resilience in network communications, the switch device comprising a signal routing mechanism configured to selectively provide communication between at least one first network port and two of a plurality of second network ports, wherein each first network port is positioned in a first array and defines a first network port order value, and each of the plurality of second network ports is positioned in a second array and defines a second network port order value, wherein each of the at least one first network port is assigned the default second network port having a common second network port order value as the first network port order value of the at least one first network port; and wherein the signal routing mechanism is further configured to:

receive an indication of a malfunction associated with one of the two of the plurality of second network ports; and communicably connect the at least one first network port with the other of the two of the plurality of second network ports, wherein each of the at least one first network port is assigned a default second network port that is one of the two of the plurality of second network ports with which the at least one first network port is connected.

2. The switch device of claim 1, wherein the plurality of second network ports comprises one or more primary second network ports and a first redundant second network port, wherein the first redundant second network port is offline in an instance in which each of the one or more primary second network ports are operable.

3. The switch device of claim 1, wherein the at least one first network port connected to the switch device comprises a plurality of first network ports, wherein an amount of the plurality of second network ports is greater than an amount of the plurality of first network ports.

4. The switch device of claim 1, wherein the first array and the second array are in communication with the signal routing mechanism via one or more optical communication mediums.

5. The switch device of claim 3, wherein the signal routing mechanism is further configured to selectively provide communication between each of the plurality of second network ports and one of the plurality of first network ports at a given instance.

6. The switch device of claim 5, wherein the plurality of first network ports comprises one or more primary first network ports and a first redundant first network port, wherein the first redundant first network port is offline in an instance in which each of the one or more primary first network ports are operable.

7. The switch device of claim 1, wherein the switch device is an optical switch.

8. A distributed switch device for providing resilience in network communications, the distributed switch comprising:

at least one first network port positioned in a first array and defining a first network port order value;

a plurality of second network ports positioned in a second array with each of the plurality of second network ports in the second array defining a second network port order value;

wherein the at least one first network port is assigned the default second network port having a common second network port order value as the first network port order value of the first network port; and at least one signal routing mechanism configured to selectively provide communication between the at least one first network port and two of the plurality of second network ports, wherein the at least one signal routing mechanism is configured to:

receive an indication of a malfunction associated with one of the two second network ports; and communicably connect the at least one first network port with the other of the two second network ports, wherein each of the at least one first network port is assigned a default second network port that is one of the two of the plurality of second network ports with which the at least one first network port is connected.

9. The distributed switch device of claim 8, wherein the plurality of second network ports comprises one or more primary second network ports and a first redundant second network port, wherein the first redundant second network port is offline in an instance in which each of the one or more primary second network ports are operable.

10. The distributed switch device of claim 8, wherein the two of the plurality of second network ports are sequential in network communication.

11. The distributed switch device of claim 8, further comprising a plurality of first network ports including the at least one first network port, wherein an amount of the plurality of second network ports is greater than an amount of the plurality of first network ports.

12. The distributed switch device of claim 8, wherein the first array and the second array are in communication via one or more optical communication mediums.

13. The distributed switch device of claim 11, wherein the at least one signal routing mechanism is configured to selectively provide communication between each of the plurality of second network ports and one of the plurality of first network ports.

14. The distributed switch device of claim 13, wherein the plurality of first network ports comprise one or more primary first network ports and a first redundant first network port, wherein the first redundant first network port is offline in an instance in which each of the one or more primary first network ports are operable.

15. The distributed switch device of claim 8, wherein, in response to an indication of a malfunction associated with one of the plurality of second network ports, the at least one signal routing mechanism is configured to terminate a connection between the second network port associated with the malfunction indication and the at least one first network port.

16. The distributed switch device of claim 8, wherein the distributed switch device is an optical switch.

* * * * *